Aug. 19, 1952     F. I. STEWART     2,607,499
INTERMEDIATE CARRYING CABLE SUPPORT FOR CABLEWAYS
Filed July 11, 1949     2 SHEETS—SHEET 1

Inventor
Felix I. Stewart

By Clarence A. O'Brien
and Harvey B. Jacobson
Attorneys

Aug. 19, 1952     F. I. STEWART     2,607,499
INTERMEDIATE CARRYING CABLE SUPPORT FOR CABLEWAYS
Filed July 11, 1949     2 Sheets—Sheet 2
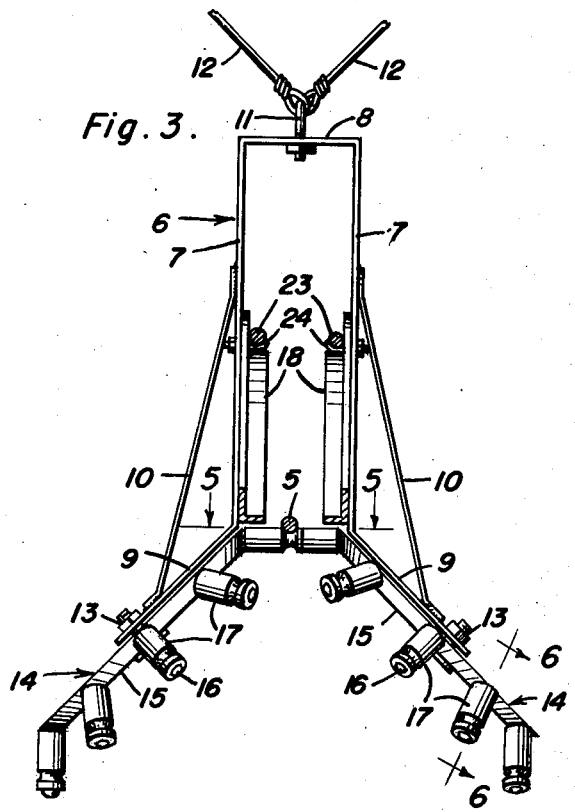
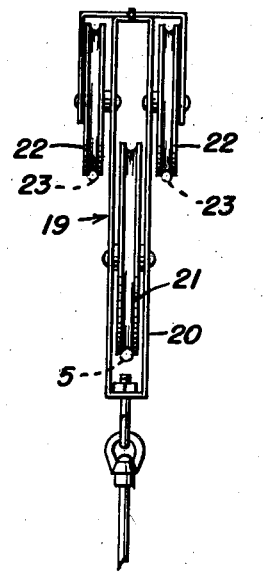
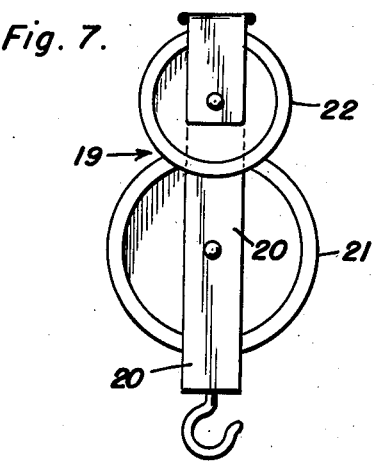
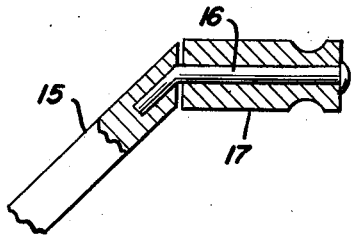
Inventor
Felix I. Stewart
By *Clarence A. O'Brien and Harvey B. Jacobson*
Attorneys Patented Aug. 19, 1952

2,607,499

UNITED STATES PATENT OFFICE 2,607,499

INTERMEDIATE CARRYING CABLE SUPPORT FOR CABLEWAYS

Felix I. Stewart, Huntsville, Ala.

Application July 11, 1949, Serial No. 104,077

6 Claims. (Cl. 212—76)

1

This invention relates to overhead cableways, and has more particular reference to an improved pendent support adapted to be suspended from upright standards at points between the ends of a cableway for supporting and preventing undue sagging of the carrying cable or cables thereof.

The present invention is particularly designed for application to cableways constructed for logging operations in hilly territory and where the strain on the carrying cable or cables is greatly varied by the different weights of the loads carried thereon.

An object of the invention is to provide an improved intermediate support of the above kind by means of which the load carrier traveling on the carrying cable or cables may be elevated to carry the load over high places with facility and ease, thereby making it possible to extend the length of the cableway without increasing the size of the carrying cable or cables.

Another object of the invention is to provide an efficient support of the above kind which is easy to install and simple in construction.

The invention comprises a certain improved construction hereinafter more fully described, shown in the accompanying drawings, and claimed.

In the drawings:

Figure 3 is a view thereof, partly in elevation and partly in transverse vertical section.

Figure 6 is a fragmentary section of one of the supporting wheels, taken on the line 6—6 of Figure 3.

Figure 7 is a side elevational view of the load carrier.

Figure 8 is a front elevational view of the carrier shown in Figure 7.

Figure 1:
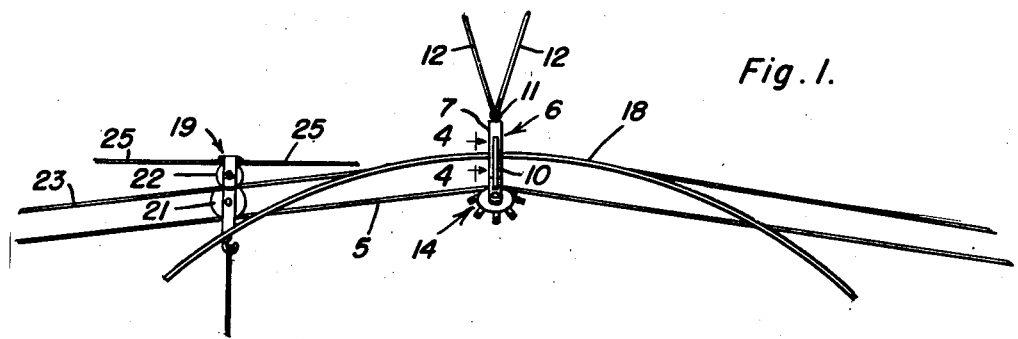
Figure 1 is a fragmentary side elevational view showing the present support associated with carrying cables of a cableway, with the load carriage about to ride onto the rails of the support.
Figure 2:
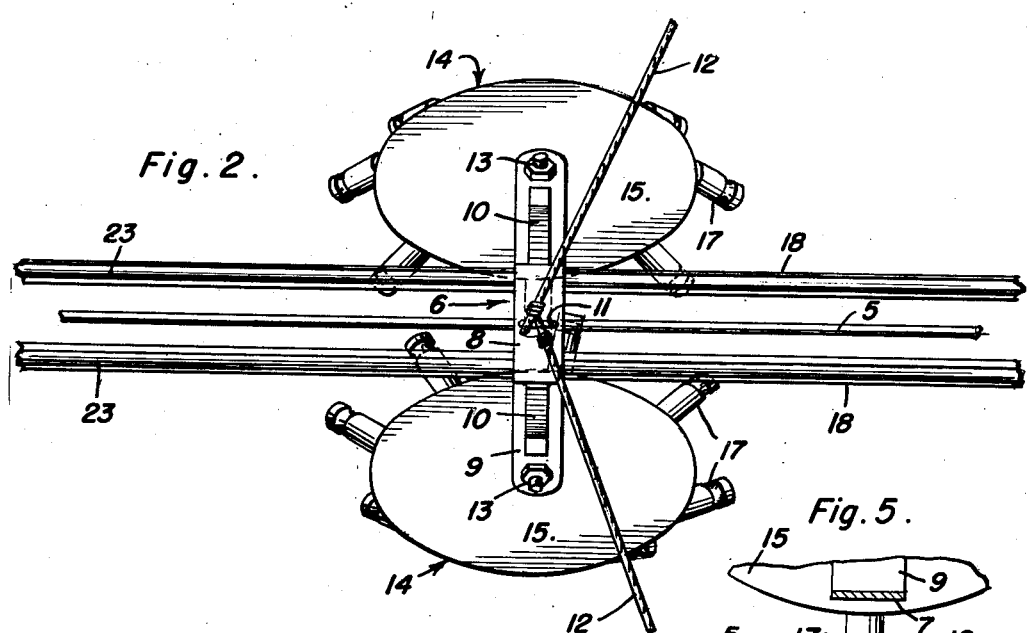
Figure 2 is an enlarged fragmentary top plan view thereof.
Figure 5:
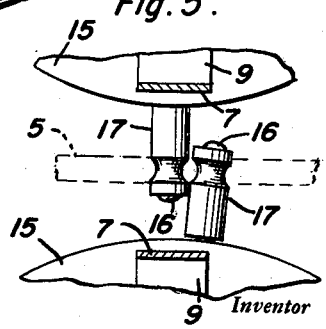
Figure 5 is a fragmentary horizontal section taken on the line 5—5 of Figure 3.
Figure 4:
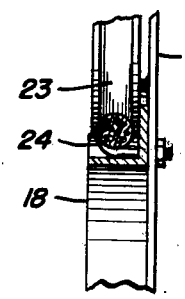
Figure 4 is an enlarged transverse section through one of the arched rails and the associated carrying cable, taken on the line 4—4 of Figure 1.

Referring in detail to the drawings, 5 indicates an elevated main carrying or track cable which may be secured at its ends to trees or other supports, not shown, as usual. In order to carry the load over high places and to enable a track cable of any desired length to be employed,

2 said cable is supported at suitable intervals or places between its ends by hangers 6. Each hanger consists of an inverted substantially U-shaped frame composed of spaced side members 7 and a connecting top member 8, the lower end portions 9 of the side members 7 being inclined in downwardly diverging relation, and being braced in this relation by braces 10. The hanger frame is provided at the top with an eye member 11 to which are secured the lower ends of inclined suspension ropes or cables 12 adapted to be anchored at their upper ends to trees or posts located at opposite sides of the cableway. Journaled at 13 on the lower ends of the inclined portions 9 of the hanger, and disposed at the inner sides of said portions, are inclined supporting wheels 14 for the track cable 5. Each wheel 14 consists of a beveled disk 15 having peripheral axles 16 which are uniformly spaced and have grooved rollers 17 journaled thereon, and which are disposed at an angle to the plane of the disk so as to assume a horizontal position at the top of the wheel. The rollers 17 of the wheels extend toward each other and are disposed so that one roller of each wheel is adjacent and overlaps a roller of the other wheel at the tops of said wheels, thereby supporting and preventing sagging of the track cable 5 which passes over the overlapping rollers. Fixed intermediate their ends to the inner sides of the upper portions of the side hanger members 7 are arched rails 18.

The load is suspended from and transported by one or more carriers 19, each composed of a frame 20 having a central grooved wheel 21 journaled in the lower portion thereof and adapted to run on the track cable 5, and smaller grooved wheels 22 journaled at opposite sides of the upper portion of frame 20 and adapted to coact with the rails 18 when the carrier passes through the hanger. The frame 20 extends below the wheel 21 and contacts the upper roller 17 of one supporting wheel 14 so as to cause the wheels 14 to turn as the carrier passes through the hanger until the succeeding rollers 17 of the wheels 14 are moved into adjacent overlapping relation at the tops of said wheels 14 in supporting relation to the track cable 5. As the wheels 14 turn, they offer little resistance to travel of the carrier through the hanger. Also, when the carrier passes through the hanger, the wheels 22 ride up the inclines of the rails 18 so as to relieve the track cable 5 and wheels 14 of most of the load and thereby prevent said cable 5 from sagging unduly.

In order to prevent side sway of the carrier and the load at places between hangers, as well as to assist cable 5 in sustaining the load, a pair of supplemental track cables 23 may be supported above and at opposite sides of the track cable 5 in position to have the wheels 22 to run thereon. When these cables 23 are used, they may be passed over and secured on the rails 18 at the highest points of the latter, as at 24. Other arrangements are possible, such as using only one central rail 18 directly above cable 5, one cable 23 passing over said one rail, and only one wheel 22 directly over wheel 21 to ride on said one rail and said one cable. The usual operating lines 25 are attached to the carrier and adapted to be operated by suitable power machinery as usual to effect hauling of the load.

From the foregoing description, it will be seen that the present invention provides a simple and efficient device for supporting the track cable or cables of a cableway at intermediate points, that the device will be subject to a minimum of wear so as to be long-lasting, and that said device will offer little impediment to travel of the carrier.

Having described the invention, what is claimed as new is:

1. An intermediate track cable hanger for cableways, comprising an inverted substantially U-shaped frame composed of spaced side members and a connecting top member, the lower end portions of said side members being inclined in downwardly diverging relation, means at the top of said frame for connecting it to suspension cables, and inclined track cable supporting wheels journaled on and disposed at the inner sides of said lower end portions of the side members in downwardly diverging relation with confronting sides, said wheels having uniformly spaced peripheral rollers on the confronting sides thereof disposed at such oblique angles to said wheels that adjacent rollers of said wheels will assume a horizontal overlapping relation under and in supporting relation to a track cable at the tops of said wheels.

2. An intermediate track cable hanger for cableways, comprising an inverted substantially U-shaped frame composed of spaced side members and a connecting top member, the lower end portions of said side members being inclined in downwardly diverging relation, means at the top of said frame for connecting it to suspension cables, inclined track cable supporting wheels journaled on and disposed at the inner sides of said lower end portions of the side members in downwardly diverging relation with confronting sides, said wheels having uniformly spaced peripheral rollers on the confronting sides thereof disposed at such oblique angles to said wheels that adjacent rollers of said wheels will assume a horizontal overlapping relation under and in supporting relation to a track cable at the tops of said wheels, and an arched track rail rigidly mounted intermediate its ends on the inner side of the upper portion of each of said side members.

3. An intermediate track cable hanger for cableways, comprising an inverted substantially U-shaped frame composed of spaced side members and a connecting top member, the lower end portions of said side members being inclined in downwardly diverging relation, means at the top of said frame for connecting it to suspension cables, inclined track cable supporting wheels journaled on and disposed at the inner sides of said lower end portions of the side members in downwardly diverging relation with confronting sides, said wheels having uniformly spaced peripheral rollers on the confronting sides thereof disposed at such oblique angles to said wheels that adjacent rollers of said wheels will assume a horizontal overlapping relation under and in supporting relation to a track cable at the tops of said wheels, a pair of arched track rails rigidly mounted within said frame in oppositely spaced relation above said wheels, and means to secure supplemental track cables on said track rails intermediate the ends of the latter.

4. An intermediate track cable hanger for cableways, comprising an inverted substantially U-shaped frame composed of spaced side members and a connecting top member, the lower end portions of said side members being inclined in downwardly diverging relation, means at the top of said frame for connecting it to suspension cables, inclined track cables supporting wheels journaled on and disposed at the inner sides of said lower end portions of the side members in downwardly diverging relation with confronting sides, said wheels having uniformly spaced peripheral rollers on the confronting sides thereof disposed at such oblique angles to said wheels that adjacent rollers of said wheels will assume a horizontal overlapping relation under and in supporting relation to a track cable at the tops of said wheels, an arched track rail rigidly mounted intermediate its ends on the inner side of the upper portion of each of said side members, and means to secure a supplemental track cable on each of said track rails intermediate the ends of the latter.

5. An intermediate track cable hanger for cableways, comprising a frame, means at the top of said frame for connecting it to suspension cables, and downwardly diverging track cable supporting wheels rotatably carried by said frame with confronting sides and having uniformly spaced peripheral rollers on the confronting sides thereof disposed at such oblique angles to said wheels that adjacent rollers of said wheels will assume a horizontal overlapping relation under and in supporting relation to a track cable at the tops of said wheels.

6. An intermediate track cable hanger for cableways, comprising a frame, means at the top of said frame for connecting it to suspension cables, and downwardly diverging track cable supporting wheels rotatably carried by said frame with confronting sides and having uniformly spaced peripheral rollers on the confronting sides thereof disposed at such oblique angles to said wheels that adjacent rollers of said wheels will assume a horizontal overlapping relation under and in supporting relation to a track cable at the tops of said wheels, and a pair of arched tracks rigidly mounted intermediate the ends thereof within the frame in laterally spaced opposite relation above said wheels.

FELIX I. STEWART.

No references cited.